United States Patent [19]
Martin

[11] Patent Number: 5,493,637
[45] Date of Patent: Feb. 20, 1996

[54] VIDEO BUFFER RECYCLING METHOD AND APPARATUS

[75] Inventor: Kevin Martin, San Jose, Calif.

[73] Assignee: Network Computing Devices, Inc., Mountain View, Calif.

[21] Appl. No.: 985,283

[22] Filed: Dec. 4, 1992

[51] Int. Cl.[6] .................................................. G06T 1/60
[52] U.S. Cl. ........................................ 395/131; 345/199
[58] Field of Search .................................. 395/122, 152, 395/154, 131; 345/122, 199

[56] References Cited

U.S. PATENT DOCUMENTS

| | | | |
|---|---|---|---|
| 4,907,174 | 3/1990 | Priem | 395/122 |
| 5,043,923 | 8/1991 | Joy et al. | 395/152 X |
| 5,050,102 | 9/1991 | Sun et al. | 395/152 |
| 5,101,365 | 3/1992 | Westberg et al. | 395/122 X |
| 5,220,646 | 6/1993 | Fossum | 395/122 |

Primary Examiner—Mark K. Zimmerman
Attorney, Agent, or Firm—James E. Eakin

[57] ABSTRACT

A method for rendering of three dimensional images on a video subsystem which does not include clearing of the Z buffer at each frame includes establishment of a Z buffer and a sequence number in memory, where the sequence number is incremented with each successive frame rendered and the Z buffer is cleared when the sequence number reaches a predetermined value; the Z buffer is thus recycled a number of times between clears. In a more elaborate implementation, the precision of the Z buffer is adjusted to permit clearing of the Z buffer to occur either as the result of the sequence number reaching a predetermined value or as the result of the accrual of a predetermined amount of time allocated for clearing, referred to as scheduling. The scheduling method can be applied to a wide range of accounting tasks within a system. In addition, a related method for recycling the image buffer is also disclosed in which multiple colormap ID's are used to distinguish data included in a current frame from data in a prior frame, where the colormap ID's associated with the prior frames all map to the background color, leaving to be displayed only the data of the current frame.

1 Claim, 8 Drawing Sheets

VIDEO BUFFER RECYCLING METHOD AND APPARATUS

FIELD OF THE INVENTION

This application relates generally to video display devices, and more specifically relates to video display devices capable of rendering graphic images.

BACKGROUND OF THE INVENTION

Video display devices for use with computers have been well known for several decades. The most common video display device consists of a monochrome cathode ray tube and supporting electronics capable of displaying only ASCII characters as text.

More recently, video display devices have been introduced which have the ability to display graphics images. In a typical implementation of such a display, the attributes— color, intensity, and so on—of each pixel on the screen are maintained in an image buffer. An image buffer is simply a memory array with sufficient storage capacity to store the appropriate information about at least each pixel displayed on the screen; many image buffers can store far more information than is displayed on the screen.

Video displays of three dimensional images typically involve construction of a wire frame model of the object being created, and many graphics displays simply display the entire wire frame model. More recently, display devices and associated software have been introduced which are capable of rendering solid, three dimensional images on the screen in a manner which closely approximates a view of the actual object. Renderings of the object typically involve elimination of "hidden" surfaces, or surfaces that would be hidden in viewing a real object, so that the only surfaces visible on the display are those which would be seen by a person viewing the real object. For example, when viewing a cube from above and to its right, three faces are visible and three faces are hidden. Although a computer representation of the cube typically will include information sufficient to display all six faces (so that a wire frame model would show all edges), a solid rendering of that object on the screen will display only the three faces a viewer would normally see.

Renderings of three dimensional images are typically created through the use of a Z buffer, which is a two dimensional memory array somewhat similar to the image buffer. The function of the Z buffer is to store the distance of each pixel forward from a reference point. Pixels with greater Z values are assumed to be in front of pixels with smaller Z values, so that the process of creating a rendering involves the conceptually simple process of calculating the Z value of each pixel for a given object and, where objects or faces of objects overlap, retaining pixels with the largest Z value (i.e., closest to the viewer). Returning to the display of the cube mentioned above, hidden faces would have smaller Z buffer values than the viewable faces.

The incorporation of a Z buffer into the image display process for a frame of video information yields three basic steps: (1) initialize the Z buffer to the minimum Z value; (2) initialize the image buffer to the background color; and (3) render all objects.

While the process of calculating Z values for a screen of pixels is conceptually simple, the need to make such calculations rapidly can create significant difficulties. A fundamental measure of performance for a video display capable of providing three dimensional renderings is the number of frames it can render per second. At least ten frames per second are required to give the illusion of motion, while higher frame rates significantly improve the appearance of motion. For simple images displayed on conventional systems, where the image buffer and Z buffer are both cleared at the beginning of each frame, the major factor in determining frame rate is the amount of time required to clear the image and Z buffers.

There has therefore been a need for a method and device which materially reduces the need to clear both the image and the Z buffers in the process of rendering three dimensional images on video display screens.

SUMMARY OF THE INVENTION

The present invention overcomes many of the limitations of the prior art by providing a first embodiment of a method and apparatus by which it is possible to render a three dimensional object on a video display without clearing the Z buffer at the beginning of each frame. In an additional embodiment, a method and apparatus are provided by which it becomes unnecessary to clear the image buffer at the beginning of each frame. The two embodiments may be combined to provide a method and apparatus for rendering three dimensional images on a video display in which neither the image buffer nor the Z buffer must be cleared at the beginning of each frame.

In a typical embodiment, the buffers must only be cleared once every sixteen frames, thus allowing nearly a sixteen-fold increase in frame rate.

The present invention, in a simplified sense, can be thought of as adding a sequence number to the data bits used for pixel data in either or both of the Z buffer and the image buffer. For convenience, the method of the present invention will be summarized here by reference only to the Z buffer, although an analogous methodology is used for recycling the image buffer.

Using the example of the Z buffer, the sequence number is provided as one or more bits concatenated to the numerically most significant bits of the Z value. As an example, in an integer implementation of the present invention, a Z buffer may have 24 bits for the Z value, and eight bits for the sequence number, for a total of 32 bits. Other sizes for the sequence number and the Z value will be acceptable in various applications.

In operation, the Z buffer is cleared initially. Clearing the Z buffer includes clearing the sequence number portion as well as the conventional Z buffer data portion. The objects in the first frame are then rendered in a conventional manner, using completely conventional Z buffer hidden surface removal algorithms. After completing the rendering of the first frame, the Z values in the Z buffer may vary widely from pixel to pixel; however, the sequence number will still be zero for every pixel in that frame. It will be apparent to those skilled in the art that, for a 24-bit Z buffer, the Z values of each pixel are bounded between 0 and $2^{24}-1$; or, if a "gap" between frames is provided, of a size $Z_{gap}$, then the Z values of each pixel are bounded between 0 and $2^{24}-Z_{gap}$.

In conventional operation, the Z buffer would be cleared again before beginning the second frame. However, in the present invention, the rendering of the second frame begins by setting the sequence number to 1; taken together with the Z buffer portion, this is equivalent to setting the minimum Z value for the second frame to $2^{24}$. The Z values for the second frame are now bounded between $2^{24}$ and $[2^{24}+2^{24}-$ 1], so that every pixel of the second frame has a combined Z value/sequence number greater than the maximum Z value of the pixels in the first frame. Again, if a gap between frames is provided with a value of $Z_{gap}$, the maximum Z value for the second frame becomes $[2^{24}+2^{24}-Z_{gap}]$. In a conceptual sense, the second frame is rendered "in front of" the first frame, since increasing Z values are rendered as being "closer" to the screen.

Each subsequent frame begins with an incrementing of the sequence number, so that each successive frame is rendered in front of the previous frames. In this way, the Z buffer need not be cleared until the maximum sequence number is reached; for an eight bit sequence number, the Z buffer must be cleared only once every 256 frames. This represents an enormous performance increase, as measured in frames per second, which can be rendered by a video controller.

The addition of the sequence number to the Z values can be accomplished in a series of steps, as in the presently preferred embodiment described hereinafter, or it can be accomplished by modification of the final transformation matrix of the 3D rendering pipeline.

The present invention can also be implemented using a floating point value for the Z buffer instead of an integer value. In such an implementation, no special number of bits is allocated as the sequence number. Instead, a floating point value is added to each successive frame, with the floating point value being sufficiently large to ensure that each successive frame is rendered in front of each previous frame. The remainder of the method and apparatus remain substantially similar to the integer implementation.

In an additional aspect of the invention, not required in all embodiments, a technique is provided for balancing the desire to clear the Z buffer and the desire for increased Z buffer precision. In particular, if a 32-bit buffer size is provided for the combination of the Z value and the sequence number, it is not necessary in all instances to fix the Z buffer at, for example, 24 bits and the sequence number at eight bits. Instead, it is possible, by carefully managing the rendering of each frame and the number of combinations of sequence numbers remaining for rendering subsequent frames, to vary the number of bits used for the Z value and the complementary number of bits used for the sequence number. By establishing a variable for the purpose of evaluating whether a clearing of the Z buffer is required, and then varying the value of the variable to permit adjustment of the precision of the Z buffer and the number of frames which can be rendered before clearing the Z buffer, a method can be provided for scheduling of the clearing step by trading between longer periods between clearing of the Z buffer and increased Z precision. Such scheduling also has more general application, and can be used to handle a large number of accounting tasks within a processor-based system.

One feature of the present invention is that the recycling method does not require that any bit already written in the Z buffer be modified.

As noted above, a similar recycling method can be applied to the image buffer. Such an arrangement provides a similar performance improvement. As with the Z buffer, the image buffer is extended to include a colormap ID, and the initial frame is assigned an arbitrary colormap ID. Each successive frame is assigned a different colormap ID, up to a limit imposed by the number of bits available or other aspects of the hardware. For each frame, the colormap associated with that frame is initialized such that pixels not having the current colormap ID map to the background color for that frame. The Z buffer recycling technique can be combined with the image buffer recycling technique to provide significantly increased throughput of the video subsystem of a personal computer, workstation or graphics terminal. As with Z buffer recycling, the image buffer recycling method of the present invention does not require that any bit already written in the image buffer be modified.

The method of the present invention can be implemented in either floating point or integer form, although integer implementations are at present generally preferred.

It is therefore one object of the present invention to provide a method and apparatus for significantly increasing the number of frames per second which can be rendered by a video subsystem.

It is a further object of the present invention to provide a method for avoiding clearing of the Z buffer in a video subsystem while still permitting rendering of multiple frames of video information.

It is yet another object of the present invention to provide a method for avoiding clearing of the image buffer while still permitting display of multiple frames of video information.

Still another object of the present invention is to provide a method of regulating the clearing of the Z buffer such that a balance is maintained between Z buffer clearing and Z buffer resolution.

A still further object of the present invention is to provide a method of recycling a video buffer without requiring that any bit already written in that buffer be modified to indicate that the buffer has been recycled.

These and other objects of the present invention will be better appreciated from the following detailed description of the invention, taken together with the appended Figures.

THE FIGURES

Figure 3A:
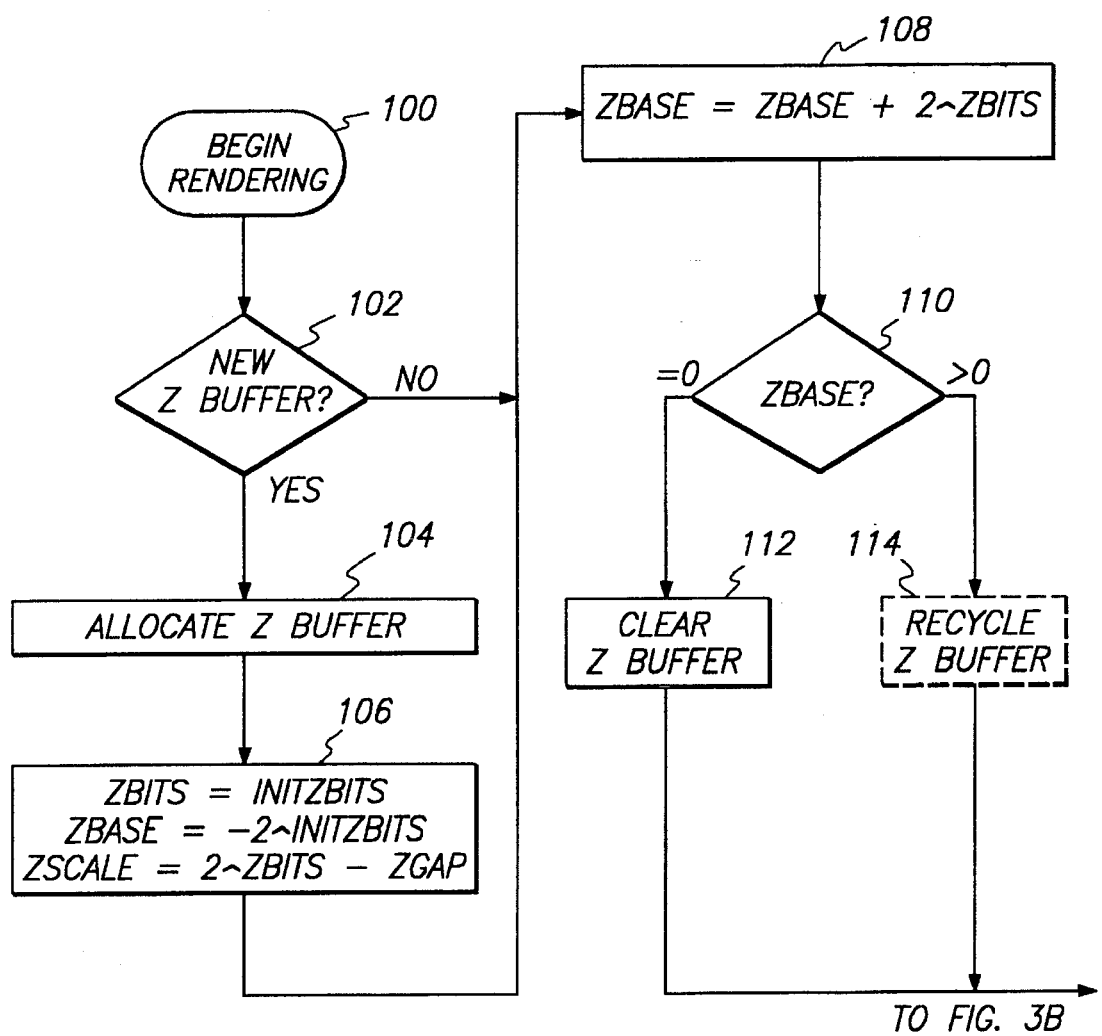
FIGS. 3A–3C show a simplified, more general form of the present invention in which only an integer implementation of Z buffer recycling is provided.
Figure 3B:
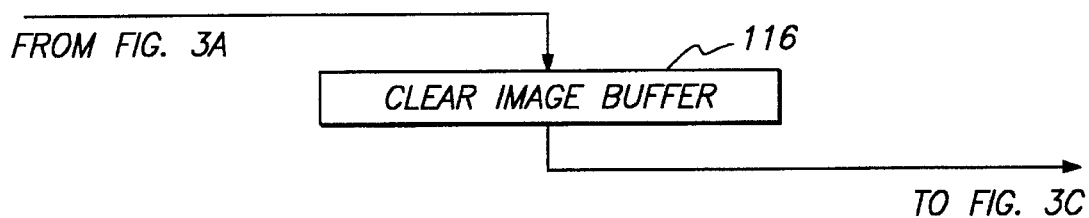

In particular, FIG. 3A shows in flow diagram form the steps for initializing the Z buffer, with Z buffer recycling according to the present invention but without scheduling;

FIG. 3B shows in flow diagram form the steps for initializing the image buffer, where only Z buffer recycling is used, without scheduling.

Figure 3C:
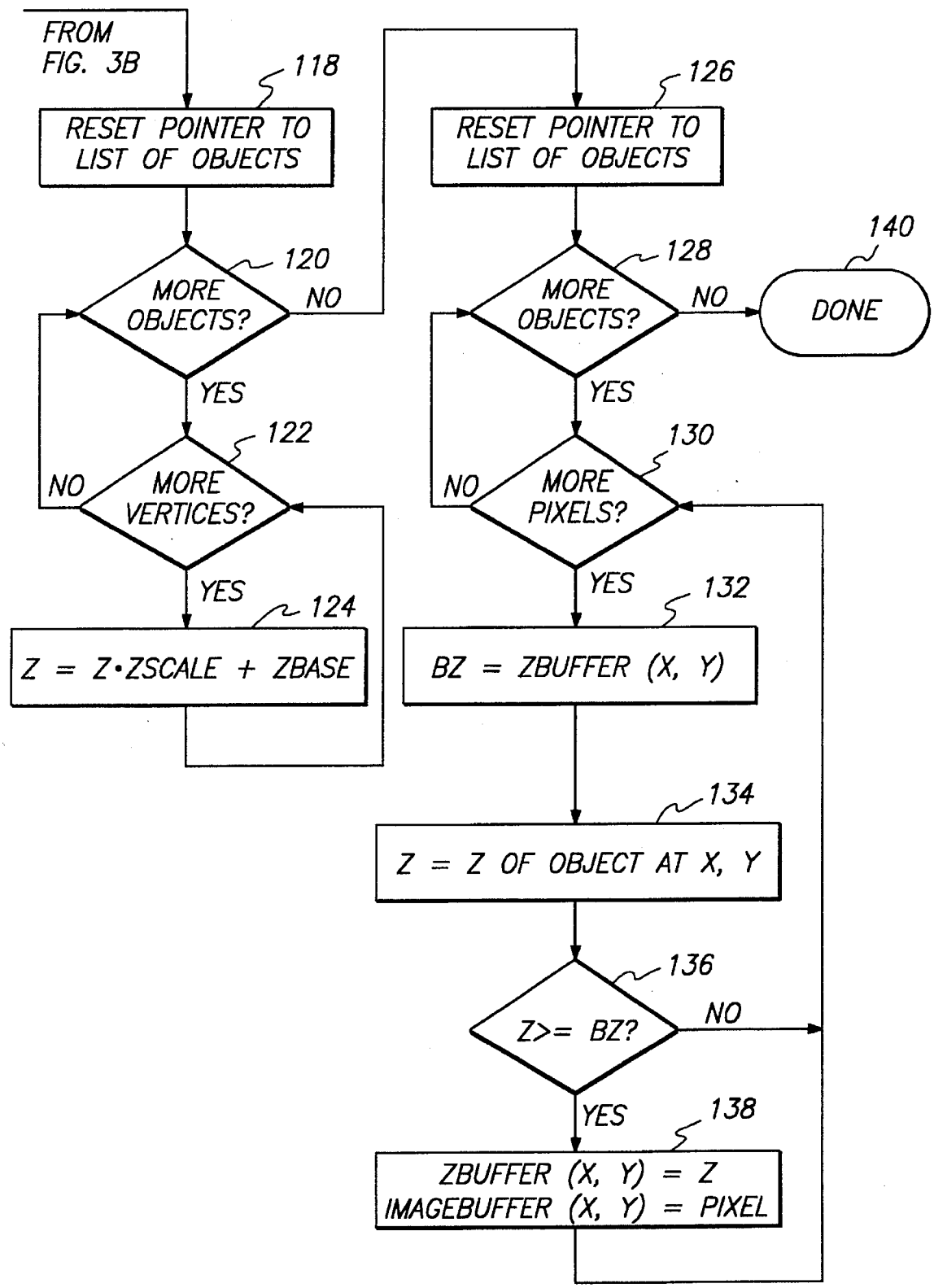

FIG. 3C shows in flow diagram form the steps for rendering of objects using the method steps shown in FIGS. 3A and 3B.

FIGS. 4A–4D show a more robust implementation of the present invention in which Z buffer recycling with scheduling is provided, together with image buffer recycling.

Figure 4A:
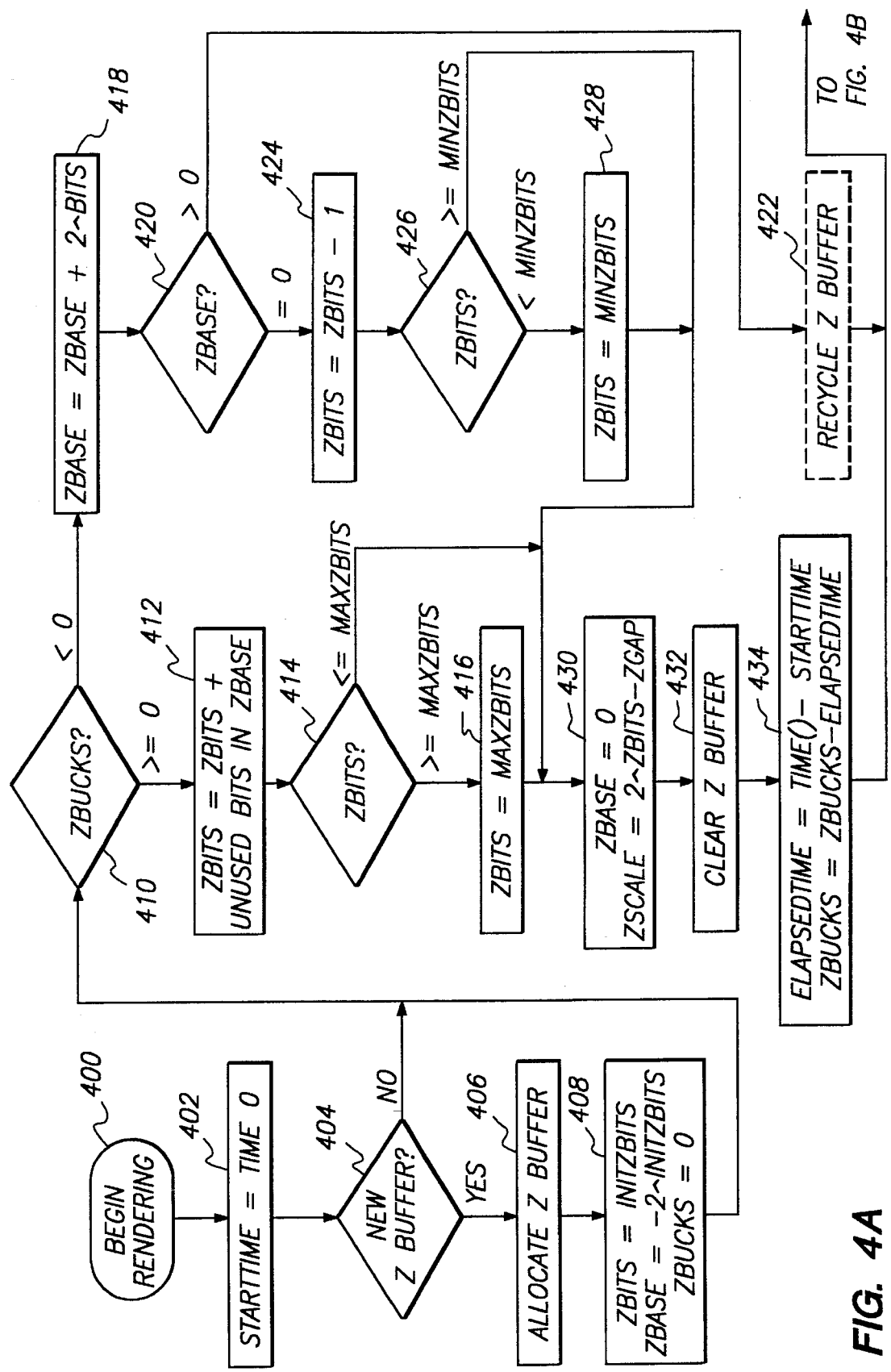
Figure 4B:
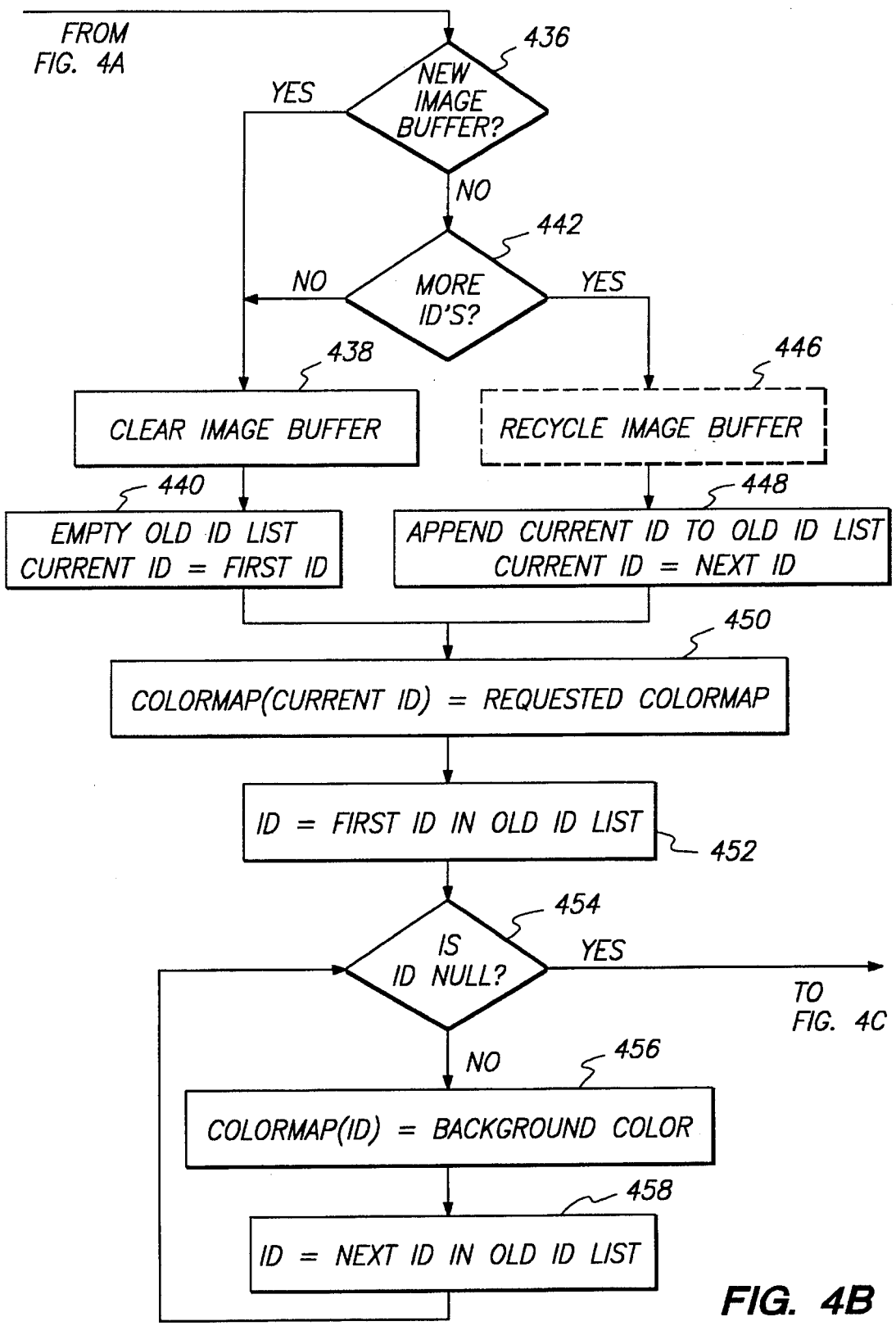
Figure 4C:
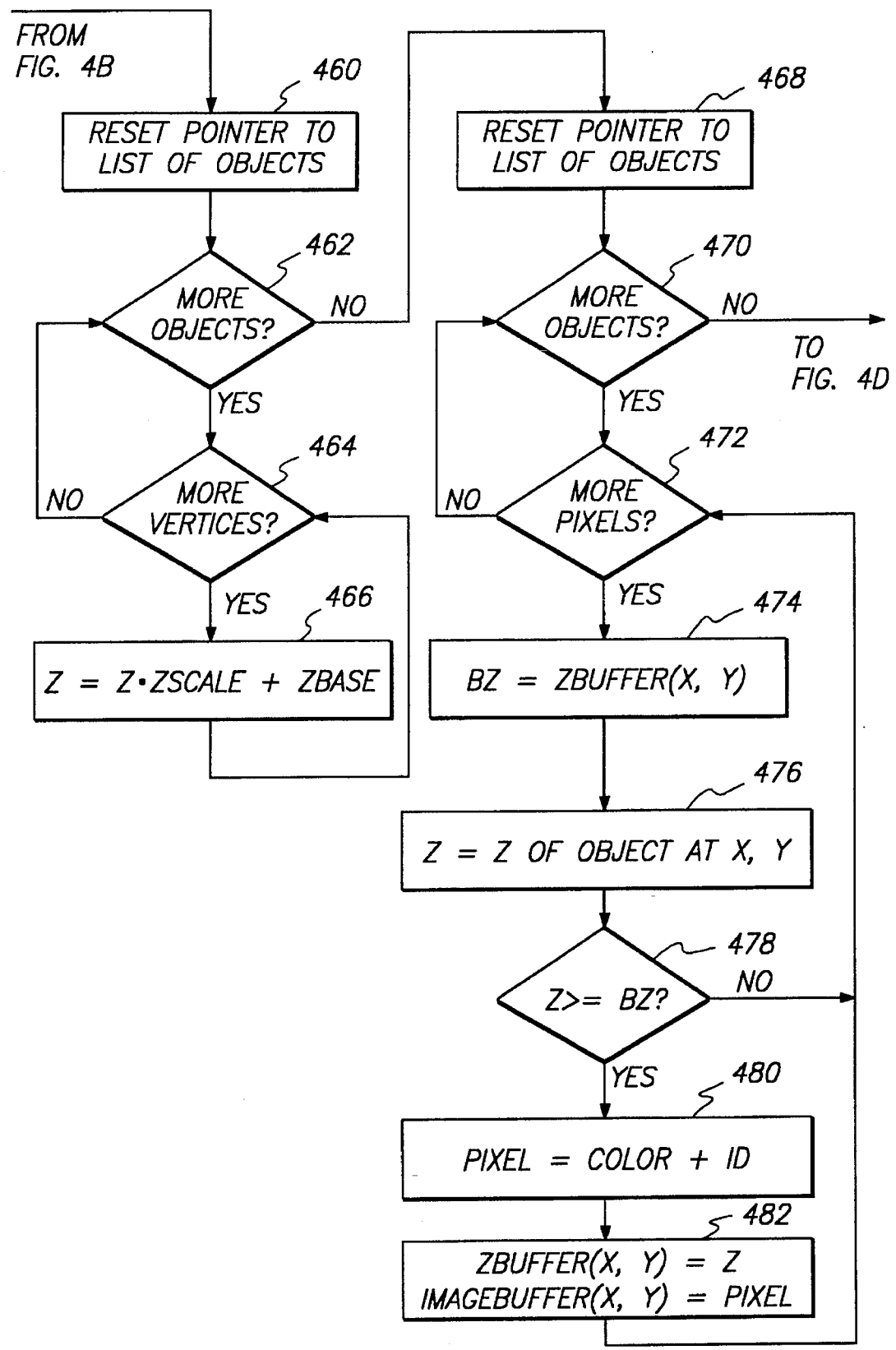
Figure 4D:
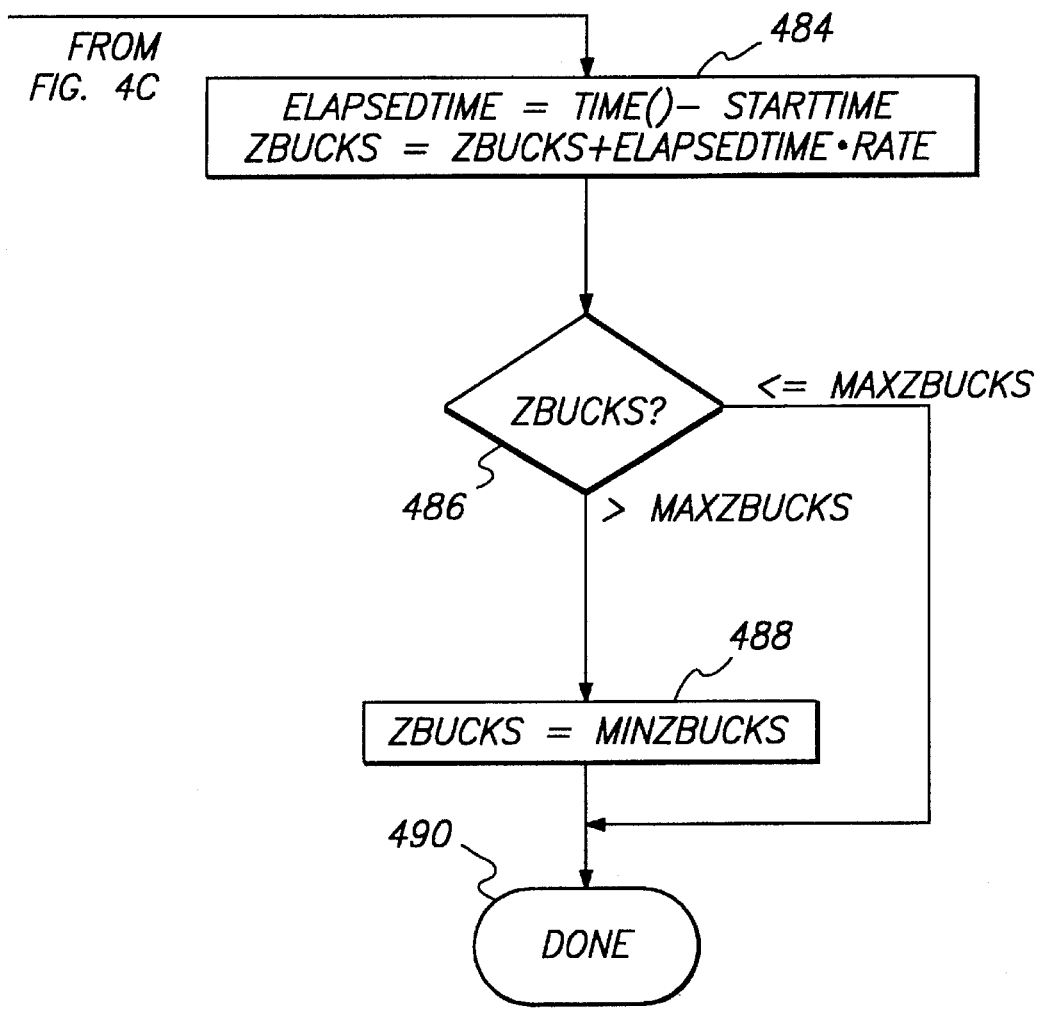

In particular, FIG. 4A shows in flow diagram form the steps for initializing the Z buffer where both recycling and scheduling is provided;

FIG. 4B shows in flow diagram form the steps for initializing the image buffer where image buffer recycling is combined with the method steps of FIG. 4A;

FIG. 4C shows in flow diagram form the steps for rendering of objects using the methods of FIGS. 4A and 4B; and FIG. 4D shows the ending steps of the process of FIGS. 4A–4C.

Figure 5:
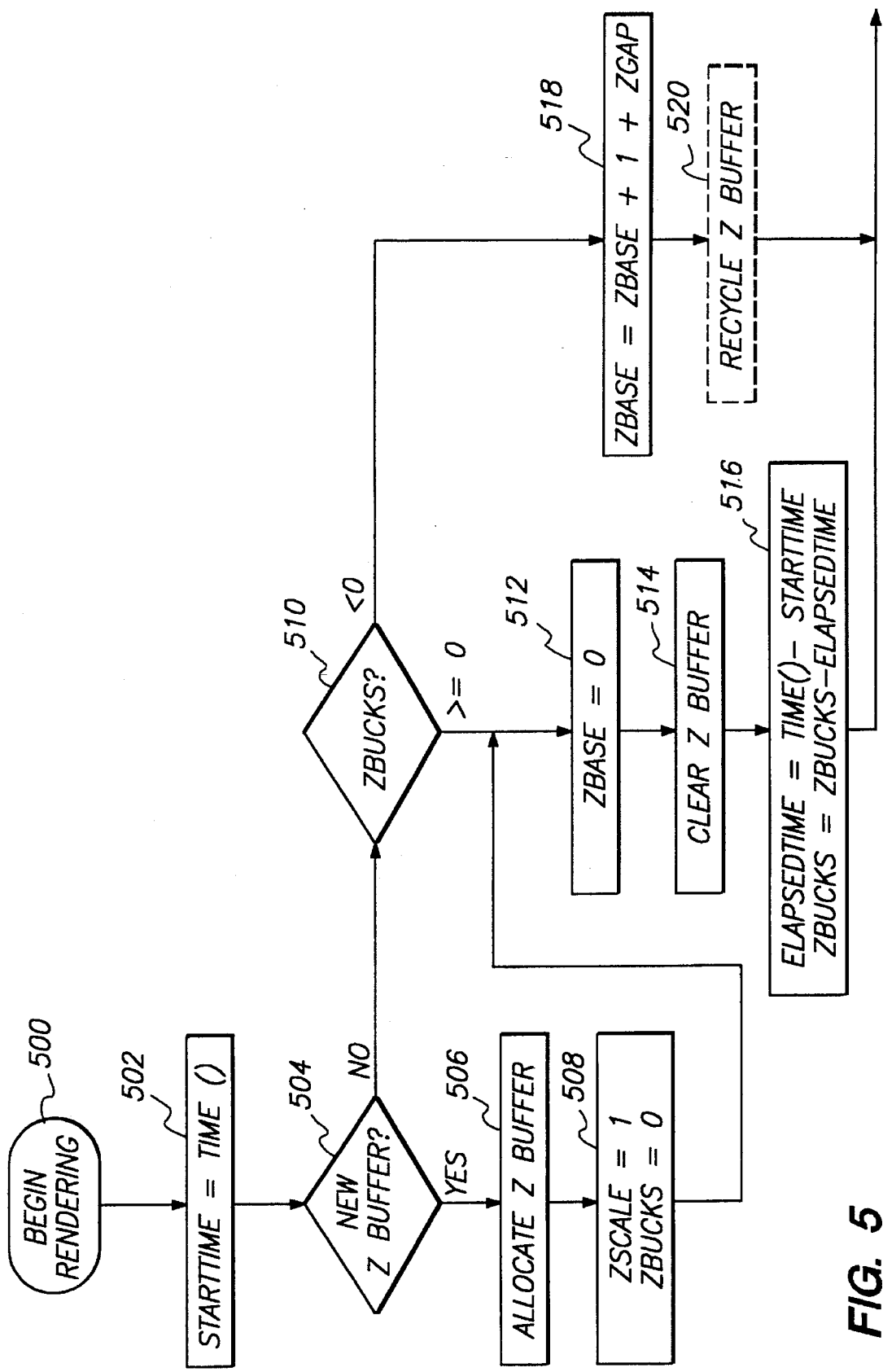

FIG. 5 shows in flow diagram form the steps for a floating point implementation of initializing the Z buffer with recycling and scheduling.

DETAILED DESCRIPTION OF THE INVENTION

Figure 1:
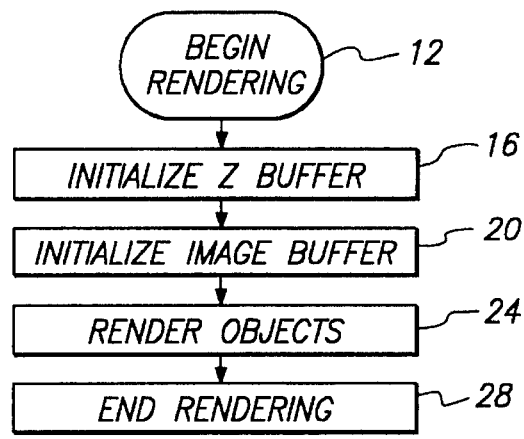
FIG. 1 shows in flow diagram form an overview of a three dimensional rendering process for a video display.

Referring first to FIG. 1, a generalized, simplified schematic setting forth the fundamental steps of three dimensional rendering of a video image on a two dimensional display. The process begins at step 12, followed by initialization of the Z buffer at step 16, initialization of the Image Buffer at step 20, and rendering of the objects at step 24, following which the process completes at step 28. While these simplified steps are applicable to both the prior art and the present invention, the remaining Figures reflect solely the present invention.

Figure 2:
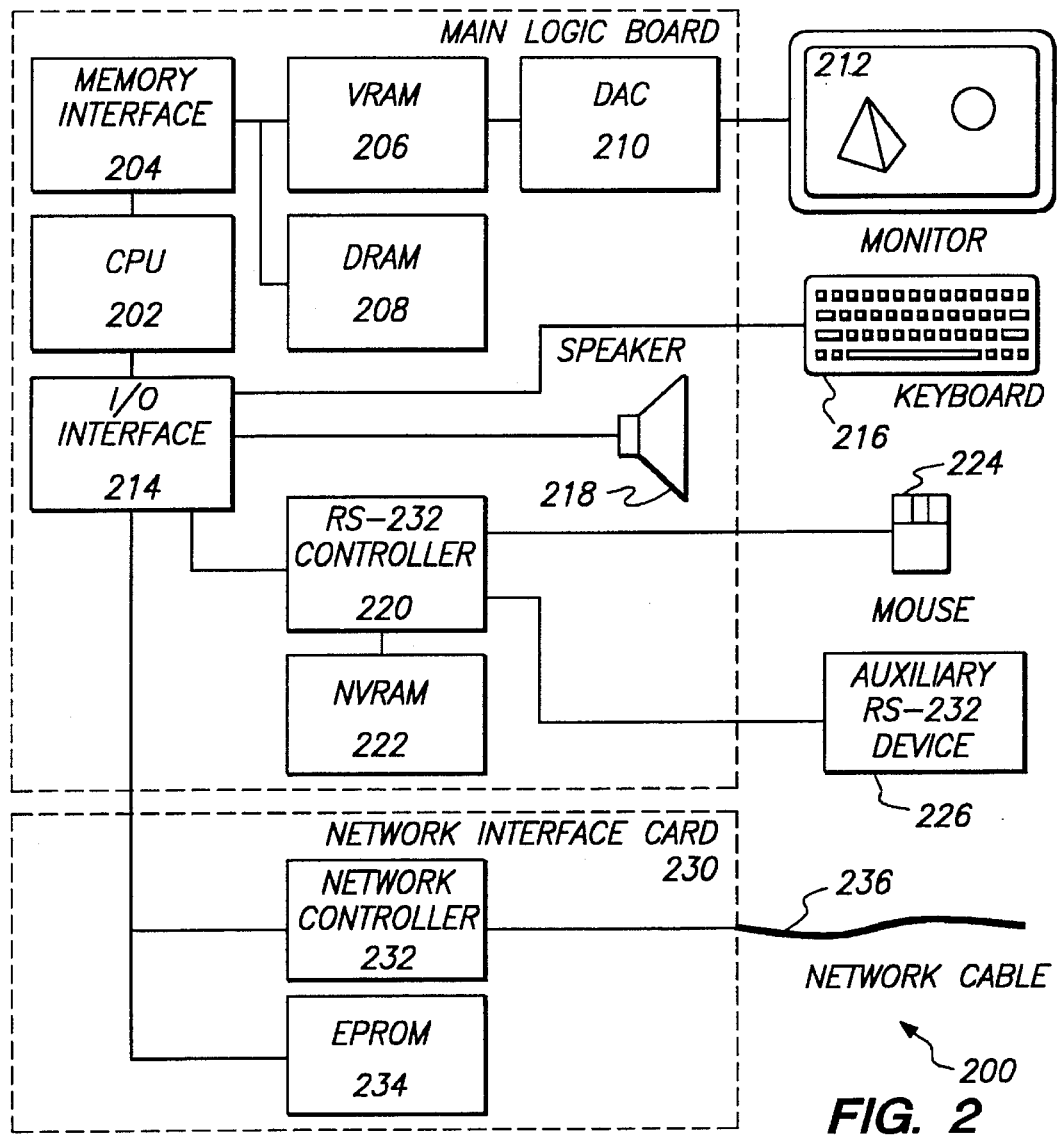
FIG. 2 is a schematic block diagram of a video subsystem in accordance with the present invention.

Next, referring to FIG. 2, an exemplary system 200 for incorporating the present invention can be better understood. Such an exemplary device may, for example, be an NCD model 19-C X-Windows terminal, although numerous other devices are capable of incorporating and benefitting from the present invention. A CPU 202 such as a Motorola 88100 communicates through a memory interface 204 with a VRAM array 206 and a DRAM array 208. The VRAM array provides signals to a colormap logic 210, which in turn provides video output to a monitor 212. Although the VRAM array 206 is frequently implemented with video RAM, in some hardware implementations conventional dynamic RAM is sufficient such that, as used hereinafter, video memory will refer to all implementations, whether video RAM, DRAM, or other forms. The colormap logic in the presently preferred embodiment is a Brooktree Bt463 RAMDAC, although other devices are acceptable depending on the degree to which the present invention is implemented, as will be discussed in greater detail hereinafter.

In addition, the CPU 202 communicates with an I/O interface 214, which in turn communicates with a conventional keyboard 216, a speaker 218, and an RS-232 controller 220. The RS-232 controller 220 also communicates with NVRAM 222 and any of a variety of conventional auxiliary RS-232 devices 226.

The CPU 202, memory interface 204, VRAM array 206, DRAM array 208, colormap logic (including, for example, a RAMDAC) 210, I/O Interface 214, speaker 218, RS-232 controller 220 and NVRAM 222 may all be incorporated on a single logic board, although such integration is not necessary in all instances. In addition, the system 200 may be connected to a network, in which case a typical arrangement, also shown in FIG. 2, can include a network interface card indicated generally at 230, and comprising a network controller 232 and an EPROM 234, each of which communicates with the I/O interface 214. The network card 230 typically connects to the remainder of the network by means of a network cable 236 extending between the network controller 232 and another node on the network. In some instances the functions performed by the network interface card 230 will be integrated into the board on which the processor resides, such that the assignment of a particular function to a particular board is unimportant.

Referring next to FIGS. 3A–3C, a generalized form of the present invention may be better appreciated. More specifically, the method of FIGS. 3A–3C show Z buffer recycling, but do not include either Z buffer scheduling or image buffer recycling; these features will be described in greater detail in connection with FIGS. 4A–4D. With particular reference to FIG. 3A, the steps involved in initializing the Z buffer in accordance with the present invention may be better appreciated; these steps achieve the overall objective of step 16 of FIG. 1, which is to initialize the Z buffer.

The process begins at step 100, followed at step 102 by checking to determine whether a new Z buffer needs to be allocated. If so, at step 104 a Z buffer is allocated in memory. In connection with the allocation of the Z buffer, at step 106 various variables are set to initial values. In particular, the variable ZBits is set to InitZBits; that is, the number of bits in the Z buffer (which defines the precision of the Z buffer) is set to an initial value, typically an integer value between 24 and 32. The variable ZBase is set equal to $-2^{\text{InitZBits}}$, and represents how far forward from the origin a particular point is. Finally, the variable ZScale is set equal to $2^{\text{ZBits}} - \text{ZGap}$, where ZScale represents a conversion factor for converting the Z values (which are typically in floating point form at this stage of processing) into integer values, and ZGap is an arbitrarily assigned variable representing a gap between successive frames. As noted previously, in some instances such a gap is not used, and ZGap is set to one.

Following assignment of the variables in step 106, and also if the check at step 102 determines that a Z buffer has already been allocated, at step 108 the variable ZBase is set equal to the sum of the prior value of ZBase and $2^{\text{ZBits}}$. A check is then made at step 110 to determine whether the value of ZBase is zero or greater than zero. If the value of ZBase is zero, the Z buffer is cleared in a conventional manner. It can be seen that ZBase will equal zero when the Z buffer is initially allocated, given the initial values of ZBits and ZBase. In addition, as will be appreciated hereinafter, ZBase will also equal zero the next time ZBase is incremented after the most significant bits have reached all 1's.

However, if the value of the most significant bits of ZBase (i.e., the bits assigned to designate sequence number) is greater than zero, the Z Buffer is recycled at step 114, and is not cleared in the conventional manner. The recycling is accomplished by having incremented the sequence number and continuing without clearing the Z buffer, followed by simply continuing on with the rendering process for the next frame. It has been found desirable to permit enough recycling that clearing take two percent or less of the total rendering time.

It should be understood that it is not necessary to use sequence numbers which are stored in bits of the word and are distinct from the Z values. An equally valid alternative is to choose an increment for ZBase which is not a power of two. In this alternative, the variable ZBits is replaced with a new variable ZIncrement, ZScale is initialized to ZIncrement minus ZGap at step 106, ZBase is incremented by ZIncrement at step 108, and the test at step 110 checks for overflow rather than zero. Yet another alternative is to use a measured rather than fixed ZIncrement. The measured value of ZIncrement can be, for example, equal to the maximum Z value rendered in the previous frame minus the ZBase of the previous frame. All of these alternatives accomplish the essential goal of rendering the objects of each successive frame in front of all objects of all prior frames.

Following the determination of whether the Z buffer is to be cleared or not, the image buffer is cleared at step 116 in FIG. 3B, after which the process of rendering objects begins in FIG. 3C by evaluating, at first, the Z values of the vertices of the various objects to be rendered. At step 118, a pointer is reset to a list of objects to be scaled and translated (sometimes referred to as "Z converted"). A check is then made at step 120, by traversing a list of objects, to determine whether additional objects remain to be scaled and translated as part of the rendering process. Those skilled in the art will appreciate that objects are typically defined in terms of their vertices. If an object was found at step 120, a check is then made at step 122, by traversing a list of vertices, to determine whether vertices exist for the current object which have not yet been Z converted. If so, an initial one of the vertices of the object is processed by determining the Z value of that vertex. If more vertices exist, at step 124 the value of Z is set to Z*ZScale+ZBase, which effectively places the current vertex at its appropriate value plus the offset of ZBase which indicates the particular frame in which the vertices are being processed.

The steps 118 through 124, which are not executed in conventional rendering, basically provide a process by which Z values of the objects to be rendered can be calculated independently of the graphical operation requested. It will be appreciated from the following description of steps 128 through 138 that the function of steps 118 through 124 could have been integrated into steps 128 through 138, although modifications to those steps would be required. However, for ease of software management, and also for greater clarity of this disclosure, the two processes have been described separately.

Eventually all vertices for a particular object will have been Z converted, and the check at step 122 will yield a "no". At that point the process will loop back to step 120 to determine whether more objects remain to be Z converted. If so, the steps 122 and 124 will be repeated for the new object; if not, the check at step 120 will yield a no, and processing will continue by resetting at step 126 the same pointer that was reset previously at step 118. It will be appreciated that steps 120 through 124 operate only on the Z values of the objects and their vertices. Beginning with step 126, the more conventional processing of X, Y and Z values begins.

Following the resetting of the pointer at step 126, a check is made at step 128 to determine whether additional objects remain to be rendered. If so, the objects are processed in a conventional manner and a check is then made at step 130 to determine whether more pixels remain to be processed. If so, the pixels are treated in a conventional manner depending on the operation requested; typically the vertices associated with such pixels are reduced to location and color, and the process continues at step 132 by setting the buffer z, or bz, value equal to the value of the ZBuffer[x,y]. In addition, at step 134 the value of z is set equal to the z value of the object at x,y.

A check is then made at step 136 to determine whether the value of z is greater than or equal to the value of bz. If so, the value of the ZBuffer at [x,y] is set equal to z, and the value of the ImageBuffer at [x,y] is set equal to the pixel value.

In conceptual terms, the steps 126 through 138 simply account for determining whether the particular point on the two dimensional screen, or pixel, associated with the object presently being rendered is in front of, or behind, a previously rendered pixel associated with a prior object or a prior face of the current object. If it is in front, the pixel associated with the current object is displayed by setting that pixel to the associated color; if behind, the pixel is left unchanged. The Z buffer value is set for the greater of the current z value or the prior z value.

The process continues by looping from step 138 back to step 130 until no more pixels remain to be processed, after which the process loops back to step 128 until all objects and all pixels associated with those objects have been processed, or rendered. When the rendering of that frame is complete, the process is done, as indicated at step 140, and rendering of the next frame can begin, by returning to step 100 of FIG. 3A.

Because the Z buffer has already been allocated, the value of ZBase will be incremented; i.e., the sequence number is incremented. Assuming this is the second frame and that the most significant bits of ZBase are not yet all ones, the value of ZBase at step 110 will exceed zero. This means that the Z buffer will not be cleared for this frame, and all objects associated with this frame will be considered to have Z values greater than the greatest Z value of the previous frame. As a result, each object of the present frame will be rendered in front of the object of the previous frame having the largest Z value.

The foregoing description of an exemplary embodiment, taken literally, involves processing each object in order until all objects are rendered. However, in at least some instances, it is desirable to select only a subset of the total number of objects, following the steps described in FIG. 3C. A second group of objects is then selected and processed, and so on until all objects are processed. Thus, the steps of FIG. 3C may be repeated numerous times in the process of rendering a single image. Objects may, under this approach, be processed in accordance with any number of hierarchical schemes. However, these more complex schemes are not described in detail for reasons of clarity, although they are within the scope of the present invention.

In addition, the foregoing exemplary embodiment assumes that a conventional methodology would clear the entire Z buffer; thus, the exemplary embodiment described above renders each successive frame ahead of the entirety of the prior frame. In rare instances in the X-Windows environment, only a partial clearing of the Z buffer is performed in conventional methodology. As a result, in such rare instances proper recycling of the Z buffer will be limited to recycling of just the area for which a partial clear would be performed. While such partial recycling is possible with the method of the present invention, the rarity of a need for it puts a detailed discussion of this feature beyond the scope of the present disclosure.

In some instances it is desirable to trade off between increased precision and a greater number of recycles between clears. This approach (referred to herein as scheduling), while more complicated than the approach shown in FIGS. 3A–3C, permits an on-the-fly evaluation of the Z precision required for each frame, and adjusts recycling accordingly. If the images being rendered are simple, less Z precision is used, more recycling is permitted and throughput is increased. Conversely, if the images being rendered are complex, more Z precision is used (in the form of additional bits to define each Z value), and the number of frames rendered between clears of the Z buffer is reduced.

It is generally desirable to maintain as high precision as possible; but it is equally desirable to improve throughput by avoiding clearing of the Z buffer as much as possible. Given this tradeoff, with the present invention it is possible to compromise by allocating a certain amount of time for clearing the Z buffer. For example, it may be arbitrarily decided that a sufficient performance improvement is provided by allocating two percent of the total rendering time for clearing of the Z buffer. In this approach, time allocated for clearing is accrued as total rendering time between clears increases. Eventually, either sufficient time for a clear will have accrued or the sequence number portion of the Z buffer will overflow; in either event, a clear is performed; for convenience, an arbitrary variable can be assigned to the time accrued for clearing, such as "ZBucks". By adjusting the number of bits used for the sequence number (and, conversely, the number of bits used for Z precision), a balance can be obtained where a clear caused by overflow of the sequence number occurs after approximately the same amount of time as it takes to accrue enough ZBucks to permit a clear. In this manner, Z precision can be maintained at the highest possible level which does not adversely affect performance. The particular method shown has been successfully tested on an NCD 19-C X-Windows terminal, and has provided very significant performance gains in rendering of three dimensional images.

While scheduling in the exemplary embodiment disclosed herein is used in combination with sequence number recycling, the scheduling technique has more general application within the environment of a processor based system. For example, time scheduling techniques can be applied to interrupts to determine which client is permitted control of the processor. In such systems, multiple clients frequently contend for access, and queue according to a predetermined hierarchy. With scheduling, it is possible to resolve such contention problems simply by allowing each client in the queue to accrue "value" based on how long that client has been waiting for access. The clients contending for access are then given priority according to the waiting time values, with the client having the greatest value given top priority. No sequence numbers or other recycling techniques are required for such applications.

Further, in many instances it will be desirable to increase throughput by recycling the image buffer in addition to recycling the Z buffer. Again, this approach complicates the method shown in FIGS. 3A–3C, but yields desirable performance benefits.

An integer implementation of the present invention which includes Z buffer recycling, Z precision scheduling and image buffer recycling is shown in FIGS. 4A–4D.

Referring first to FIG. 4A, the process begins at step 400 and continues at step 402 by setting a variable StartTime to the current time. A check is then made at step 404 to determine whether a Z buffer already exists. If not, a Z buffer is established in video memory at step 406, followed by setting the variables ZBits, ZBase and ZBucks to initial values. In particular, and as discussed in connection with FIG. 3A, ZBits is set to an InitZBits value and ZBase is set to $-2^{\text{InitZBits}}$. Unlike FIG. 3A, however, ZScale is not set and instead the new variable, ZBucks, is set to zero. Implementation of the variable ZBucks permits on-the-fly adjustment in Z precision to permit increased or decreased numbers of recycles between clears, as will be appreciated from the following. Upon completion of step 408, or if the check at step 404 establishes that a Z buffer has already been allocated, processing continues at step 410.

At step 410, a check is made to determine whether the value of ZBucks is less than zero. On the initial cycle, ZBucks will equal zero, and so processing continues at step 412 by setting the current value of ZBits equal to the prior value of ZBits plus the unused most significant bits in ZBase. For example, if ZBase has zeroes in the three most significant bits, there are three unused bits in the portion of ZBase assigned to sequence numbering which could instead have been allocated to Z precision. As previously noted, in a typical high performance embodiment, ZBits can range between 24 and 32 bits, although lower resolutions are also well known. By adjusting ZBits in this manner, precision can be allowed to shift between predetermined maximum and minimum values. The initial value of ZBase is set, arbitrarily, to $-2^{\text{InitZbits}}$ to mark all bits as "used" for processing at step 412, so that for the initial frame ZBits is left unchanged from its initial value of InitZBits. InitZbits is assigned a value based on a balancing between acceptable performance and acceptable precision for an anticipated image, where no data has yet been received. Although it has been established empirically that using MinZbits as the initial value of InitZbits provides an appropriate balance, in some instances other values in the range of MinZBits to MaxZbits would be acceptable.

After adjusting the value of ZBits at step 412, processing continues at step 414 by checking whether ZBits is greater than the maximum number of bits allowed to be allocated for precision, referred to as MaxZBits. If so, at step 416 the value of ZBits is set equal to MaxZBits. If not, step 416 is bypassed and the value of ZBits is left unchanged.

If, at step 410, the value of ZBucks is less than zero, as it will normally be for reasons discussed in more detail hereinafter, processing will branch to step 418, which corresponds to step 108 of FIG. 3A. Again, the incrementing of ZBase which occurs at step 418 is an attempt to recycle the Z buffer. A check is then made at step 420 to determine whether an overflow exists. If not, recycling of the Z buffer for this frame is successful, and processing continues at step 422. The step 422 is shown with dashed lines because the step is shown for convenience only, to establish that an event was recognized, and does not represent any actual processing.

If the value of ZBase is equal to zero at step 420, recycling will not be successful on this frame and processing continues at step 424 by setting the value of ZBits equal to the prior value of ZBits minus one. In effect, this amounts to borrowing a bit from the number of bits allocated for Z precision in those instances where recycling is desired, but no more sequence number bits are available. The value of ZBits is then compared at step 426 to the minimum value of ZBits (MinZBits), and if it is less than the acceptable minimum, ZBits is reset to MinZBits at step 428. If ZBits is greater than or equal to the value of MinZBits, step 428 is bypassed.

Processing then continues at step 430, either as the result of step 416, or the bypass of step 416 at step 414, or step 428 or its bypass at step 426. At step 430, ZBase is set to zero, and ZScale is set to $2^{\text{ZBits}}-\text{ZGap}$. The Z buffer is then cleared at step 432, followed at step 434 by setting the variable ElapsedTime equal to time() minus StartTime, and the variable ZBucks equal to the prior value of ZBucks minus ElapsedTime.

Processing then continues in FIG. 4B, which shows in flow diagram form the steps associated with recycling of the image buffer. It will be appreciated that, once the objects have been converted to pixel information the pixel data is stored in the image buffer. Further, and as previously mentioned, the presently preferred embodiment of the invention employs a Brooktree Bt463 RAMDAC, which is noteworthy in that it has multiple logical color lookup tables. Each logical color lookup table has associated therewith a unique ID, which can alternatively be referred to as either a window ID or a colormap ID.

In general, the process for recycling of the image buffer involves using the multiple colormap IDs (equivalent to the "window ID" identified by Brooktree in the Bt463 documentation) associated with the multiple color lookup tables, with one colormap ID for each frame. Each application typically has associated with it a colormap. The colormap associated with the application is then loaded into the appropriate logical color lookup table associated with the colormap ID for the current frame. The pixel data stored in the image buffer comprises, for each pixel, colormap ID information and color information. After the first colormap is loaded and the objects in that frame are rendered, the first frame is displayed by interpreting the pixel data from the image buffer.

In conventional systems, the image buffer would be cleared after the rendering of the first frame. However, in the present system, such clearing is not performed. Instead, the second frame is assigned a second colormap ID, such that every pixel associated with an object rendered in the second frame includes the second colormap ID as part of its pixel data. Since the only pixels written to the image buffer as the result of processing the second frame will be those pixels associated with objects in the second frame, the image buffer will now have stored in it a number of pixels from the first frame, which include the first colormap ID in their pixel data, and a number of pixels from the second frame, which include the second colormap ID in their pixel data.

By programming the colormap hardware to map all pixels with old colormap ID's to the background color, only pixels from the second frame are evaluated for their color data. As a result, only the second frame is displayed. The third frame is treated similarly, in that it is assigned a unique colormap ID and each pixel in the image buffer representing an object in that third frame includes that third colormap ID in its pixel data. As before, all prior colormap ID's are mapped to the background color, leaving only the image of the third frame displayed on the screen.

Such recycling can be repeated for as many unique colormap IDs as are provided by the hardware. Thus, for example, if eight colormap IDs are available, the image buffer can be written to once and then recycled seven times before it must cleared again, with a concomitant increase in throughput.

With the foregoing in mind, the process of FIG. 4B can be better understood. Processing begins at step 436 by checking to determine whether a new image buffer is required, or, conversely stated, whether an image buffer has already been allocated. Those skilled in the art will recognize that, while the Z buffer is typically allocated by the renderer, the image buffer is typically allocated by the client (i.e., the application). Thus, step 436 effectively checks to see if the renderer has just been handed a new image buffer to render into.

If the image buffer is new and has never been cleared, processing continues by clearing the image buffer at step 438, followed at step 440 by emptying the old colormap ID list and setting the value of the variable Current ID equal to the next available colormap ID.

Alternatively, if the check at step 436 indicated that an image buffer had not changed, processing would continue at step 442 by checking whether additional colormap IDs remained to be processed. Unlike conventional rendering methods, a new colormap ID is provided for each frame. If no additional colormap ID's remain to be allocated, the frame has been fully recycled and processing continues at step 438 by clearing the image buffer. However, if more ID's do remain to be allocated, recycling is permitted as indicated by the dashed box at 446. Processing continues at step 448 by appending the current colormap ID to the old colormap ID list and setting the current ID equal to the next available colormap ID.

After either step 440 or step 448 is completed, processing continues at step 450 by programming the colormap hardware for the current ColorMap ID to the requested colormap. Following that, at step 452, by setting the value of the ID equal to the first ID in the old ID list. The value of the ID is checked at step 454 to determine if it is null; that is whether all ID's have been processed. If not, the colormap hardware is programmed to map all pixels with the colormap ID (selected from the old ID list) to the background color for the current frame, followed by setting the current ID to the next ID in the old ID list at step 458. Following completion of step 458, the process loops back to step 454 to determine whether there are any additional ID's remaining to be processed. If not, the ID will be null, and processing continues at FIG. 4C.

Although the foregoing description of the preferred method involves the use of colormap hardware having multiple color lookup tables, it will be appreciated that such sophisticated colormap hardware is not required in every instance. For example, in some embodiments the image buffer will be ten bits deep even though only eight bits are required for color information. In such cases, two bits are unused and can be assigned as colormap ID's, in which case the image buffer can be written to and then recycled three times.

FIG. 4C shows in flow diagram form the steps involving in rendering of objects where image and Z buffering recycling has been implemented, in addition to Z scheduling. From step 454 of FIG. 4B, processing continues at steps 460 through 482 which operate the same as corresponding steps 118 through 138 of FIG. 3C with the exception of step 480. Step 480, which reflects the recycling of the image buffer, sets the color of a pixel to the color+ID (where ID is the current ID set once per frame at either step 440 or step 448) of the current object if the z value of the currently rendered pixel is greater than the bz value. In addition, once the check at 470 yields no more objects to be processed, processing continues in FIG. 4D instead of being completed as in FIG. 3C.

In FIG. 4D, processing continues at step 484 by setting the value of ElapsedTime equal to time() minus the StartTime, and also setting ZBucks equal to the prior value of ZBucks plus the result of ElapsedTime multiplied by a predetermined rate. The predetermined rate is the rate at which time allocated for a clear accrues. For example, if, as was previously used as an example, it has been determined that adequate performance is achieved by allocating two percent of total rendering time for clearing, the rate can represent the two percent value. Then, at step 486, the value of ZBucks is compared to a predetermined maximum value, MaxZBucks. If the value of ZBucks exceeds the allowable maximum, ZBucks is reset to MaxZBucks at step 488; otherwise, step 488 is bypassed and the current value of ZBucks is retained. This prevents an excess accumulation of ZBucks caused by rendering very complex images at maximum Z precision, which could result in excessive Z buffer clearing with subsequent simple images. However, such limitations on accumulated ZBucks are not required in all instances. The rendering of the frame completes at step 490, allowing the rendering of the next frame to continue by returning to FIG. 4A.

Although FIGS. 4A–4D show an integer implementation, it is also possible to provide a floating point implementation of a Z buffer which includes recycling and scheduling. Such an implementation is shown in FIG. 5, where processing begins at step 500 and continues at step 502 by setting a variable StartTime equal to the current time, or time(). At step 504 a check is made to determine whether a new Z buffer is to be allocated.

If so, processing continues at step 506 by allocating a new Z buffer in memory, which can be either VRAM or conventional DRAM depending on hardware implementation, and at step 508 the variables ZScale and ZBucks are set to initial values of 1 and 0, respectively. If not, i.e., if a Z buffer has already been allocated, processing continues at step 510 by determining whether the value of ZBucks is less than zero or not. If ZBucks is greater than or equal to zero, or after completing step 508, processing continues at step 512 by setting the value of ZBase equal to zero and, at step 514, clearing the Z buffer. Then, at step 516, the variable ElapsedTime is set to time ()less StartTime [where time () is current time], and the variable ZBucks is adjusted to be the prior value of ZBucks less the value of ElapsedTime.

If, however, the value of ZBucks is less than zero, recycling is permitted, and the value of ZBase is adjusted at step 518 to be the prior value of ZBase plus one plus the arbitrary gap size, ZGap. Those skilled in the art will appreciate that the Z values for the first frame range between 0.0 and 1.0, such that adding one will ensure that each Z value in the new frame is greater than the maximum value of the prior frame. A typical value for the gap size, ZGap, is 0.01. Success of the recycling step is then indicated by the dashed box of step 520; either after completion of step 516 or after successfully recycling the Z buffer at step 518, processing continues at FIGS. 4B through 4D as previously described.

In an alternative embodiment, it is also possible to increment Zbase by the maximum Z value rendered in the previous frame, rather than by the power of two shown in detail above. In such an instance, the tests at steps 110 and 420 are modified to test for overflow rather than zero. It will be appreciated by those skilled in the art that the size of the increment is not critical so long as it is within a suitable range. It will also be appreciated that a clearing of either the image buffer or the Z buffer need not, in accordance with the present invention, involve a conventional clear of each bit in the buffer. Instead, in at least some implementations only the portion of the Z buffer which represents the sequence number need be cleared. Likewise, for the image buffer only the portion which represents the colormap ID need be cleared. Still further, in at least some instances only a part of those respective portions needs to be cleared, although the additional recycling made possible by such partial clearing may be less than if all of the portions had been cleared.

Having fully described one embodiment of the present invention, it will be apparent to those of ordinary skill in the art that numerous alternatives and equivalents exist which do not depart from the invention set forth above. It is therefore to be understood that the invention is not to be limited by the foregoing description, but only by the appended claims.

What is claimed is:

1. In a video display device capable of displaying frames of video information as three dimensional renderings and having a memory array including an image buffer addressed by a plurality of address bits, a method for sequentially displaying multiple frames of video information without clearing the image buffer between frames, the method comprising the steps of clearing the image buffer, assigning to a first frame to be displayed indicia representing a first colormap, assigning to each pixel associated with an object in the first frame indicia representing the first colormap together with other pixel information, the combination of the indicia representing the first colormap and the other pixel information together forming the pixel data for the first frame, writing to the image buffer the pixel data for the first frame, mapping to a requested color the pixel data stored in the image buffer and having the indicia representing the first colormap, assigning to a next frame to be displayed indicia representing a next colormap, assigning to each pixel associated with an object in the next frame indicia representing the next colormap together with other pixel information, the combination of the indicia representing the next colormap and the other pixel information together forming the pixel data for the next frame, writing to the image buffer the pixel data for the next frame, mapping to a background color the pixel data stored in the image buffer and not having the indicia representing the next colormap, mapping to a requested color the pixel data stored in the image buffer and having the indicia representing the next colormap, and repeating for each subsequent frame up to a predetermined limit the assigning, writing and mapping steps for the next frame.

\* \* \* \* \*